United States Patent
Dea et al.

(10) Patent No.: US 9,677,444 B2
(45) Date of Patent: Jun. 13, 2017

(54) REDUCTANT SUPPLY SYSTEM

(71) Applicant: Caterpillar Inc., Peoria, IL (US)

(72) Inventors: Kevin L. Dea, Morton, IL (US); Brian M. Cole, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1 day.

(21) Appl. No.: 14/830,222

(22) Filed: Aug. 19, 2015

(65) Prior Publication Data

US 2017/0051648 A1     Feb. 23, 2017

(51) Int. Cl.
*F01N 3/20* (2006.01)

(52) U.S. Cl.
CPC .............. *F01N 3/208* (2013.01); *F01N 3/206* (2013.01); *F01N 2560/026* (2013.01); *F01N 2610/02* (2013.01); *F01N 2610/144* (2013.01); *F01N 2610/1406* (2013.01); *F01N 2610/146* (2013.01); *F01N 2610/148* (2013.01); *F01N 2610/1473* (2013.01); *F01N 2900/1402* (2013.01); *F01N 2900/1812* (2013.01); *F01N 2900/1821* (2013.01); *F01N 2900/1822* (2013.01)

(58) Field of Classification Search
CPC .... F01N 3/206; F01N 3/208; F01N 2560/026; F01N 2610/02; F01N 2610/1406; F01N 2610/144; F01N 2610/146; F01N 2610/1473; F01N 2610/148; F01N 2900/1402; F01N 2900/1808; F01N 2900/1812; F01N 2900/1821; F01N 2900/1822

USPC ............................ 60/274, 276, 286, 295, 301
See application file for complete search history.

(56) References Cited

U.S. PATENT DOCUMENTS

| 8,931,259 | B2 | 1/2015 | Yan et al. | |
|---|---|---|---|---|
| 2009/0104085 | A1* | 4/2009 | Ichikawa | F01N 3/208 422/112 |
| 2011/0107742 | A1* | 5/2011 | Igarashi | F01N 3/208 60/277 |
| 2011/0232267 | A1* | 9/2011 | Bruck | F01N 3/208 60/274 |
| 2013/0067889 | A1 | 3/2013 | Parrish et al. | |
| 2013/0283771 | A1* | 10/2013 | Nagata | F01N 3/2066 60/282 |

(Continued)

FOREIGN PATENT DOCUMENTS

| WO | 2013135401 | 9/2013 |
|---|---|---|
| WO | 2014038084 | 3/2014 |
| WO | 2014060313 | 4/2014 |

*Primary Examiner* — Jorge Leon, Jr.
(74) *Attorney, Agent, or Firm* — Miller, Matthias & Hull

(57) ABSTRACT

A reductant supply system for an exhaust aftertreatment system is disclosed. The reductant supply system may include a controller configured to receive an engine system operation signal and transmit a reductant delivery signal in response to the engine system operation signal, an injector configured to dispense a reductant fluid into an exhaust gas flow of the exhaust aftertreatment system in response to the reductant delivery signal, and a pump configured to actuate between an off condition and an on condition in response to the reductant delivery signal. Furthermore, the reductant supply system may include a recycle line and a two-way valve positioned in the recycle line configured to actuate between a closed position and an open position in response to the reductant delivery signal.

10 Claims, 4 Drawing Sheets

(56) References Cited

U.S. PATENT DOCUMENTS

2016/0010529 A1* 1/2016 Wang ................. F17D 3/00
60/274

* cited by examiner

REDUCTANT SUPPLY SYSTEM

TECHNICAL FIELD

This disclosure generally relates to an exhaust aftertreatment system, and more particularly to a reductant supply system for an exhaust aftertreatment system.

BACKGROUND

An exhaust aftertreatment system associated with an engine may include a reductant supply system for delivery of a reductant fluid into an exhaust stream of the engine. The reductant supply system may include a reductant fluid tank for storing the reductant fluid, fluid conduits for transporting the reductant fluid throughout the reductant supply system, a pump for propelling the fluid throughout the reductant supply system and an injector that delivers the reductant fluid into the exhaust stream of the engine. Additionally, one such fluid conduit may be a recycle line that returns some of the reductant fluid being transported throughout the reductant supply system to the reductant fluid tank.

Customarily, the flowrate of reductant returning to the reductant fluid tank is controlled by placing a restriction, such as a throttle-valve, in the recycle line. Because the cross-sectional area of this restriction is constant, the flowrate of the reductant fluid sent to the injector is therefore a function of pump speed. However, if the pump is undersized relative to the flowrate needed at the injector, it may fail to meet the demand required at the injector. Therefore, reductant supply system designers typically specify a pump that is oversized relative to the maximum flowrate required by the injector, with some excess energy being lost as heat during passage of the reductant fluid through the supply system, including the restriction. Such designs, therefore, are energy inefficient.

One reductant supply system design is described in the Patent Cooperation Treaty application PCT/EP2013/050783 having publication number WO/2013/135401 (the '401 publication). The '401 publication describes a reductant supply system that may include a reductant fluid tank for storing the reductant fluid, fluid conduits for propelling the fluid throughout the reductant supply system, a pump for propelling the fluid throughout the reductant supply system and an injector that delivers the reductant fluid into an exhaust stream. The '401 publication also describes that it may include a recycle line.

Importantly however, the '401 publication describes that the restriction in the recycle line is replaced by a proportioning valve. Further, the '401 publication describes that the proportioning-valve includes an orifice with a variable cross-sectional area, and the period the orifice is open is variable too. Accordingly, the flowrate of the fluid sent to the injector is a function of the pump speed, the cross-sectional area of the orifice and the period the orifice is open, thereby leading to complex closed loop control schemes since pump speed, cross-sectional area of the orifice and duration the orifice is open all control the flowrate of fluid sent to the injector.

Hence, more energy efficient reductant supply systems without the need to employ complex closed loop control schemes are necessary. The present disclosure is directed to overcoming one or more problems set forth above and/or other problems associated with the prior art.

SUMMARY

In accordance with one aspect of the present disclosure, a reductant supply system for an exhaust aftertreatment system is disclosed. The reductant supply system may include a controller configured to receive an engine system operation signal and transmit a reductant delivery signal in response to the engine system operation signal and an injector configured to dispense a reductant fluid into an exhaust gas flow of the exhaust aftertreatment system in response to the reductant delivery signal. Additionally, the reductant supply system includes a pump configured to actuate between an off condition and an on condition in response to the reductant delivery signal, the off condition precluding the pump from propelling the reductant fluid to the injector, the on condition permitting the pump to propel the reductant fluid to the injector. Lastly, the reductant supply system may include a two-way valve positioned in a recycle line configured to actuate between a closed position and an open position in response to the reductant delivery signal, the closed position precluding the reductant fluid from flowing through the recycle line to a reductant fluid tank, the open position permitting the reductant fluid to flow through the recycle line to the reductant fluid tank.

In accordance with another aspect of the present disclosure, an exhaust aftertreatment system is disclosed. The engine system may include an engine and an exhaust conduit fluidly coupled to the engine and configured to convey an exhaust gas flow of the engine. Further, the engine system may include an injector fluidly coupled to the exhaust conduit and configured to dispense a reductant fluid into the exhaust gas flow of the engine in response to a reductant delivery signal and a pump configured to actuate between an off condition and an on condition in response to the reductant delivery signal, the off condition precluding the pump from conveying the reductant delivery fluid to the injector, the on condition permitting the pump to convey the reductant fluid to the injector. Further, the engine system may include a recycle line fluidly coupled to the pump and the injector, located downstream of the pump and upstream of the injector and configured to return the reductant fluid to a reductant fluid tank and also include a two-way valve positioned in the recycle line configured to actuate between a closed position and an open position in response to the reductant delivery signal, the closed position precluding the reductant fluid from returning to the reductant fluid tank through the recycle line, the open position permitting the reductant fluid to return to the reductant fluid tank through the recycle line. Lastly, the engine system may include a controller configured to receive an engine system operation signal, transmit the reductant delivery signal and transmit a pump flowrate adjustment signal.

In accordance with another embodiment of the present disclosure, a method of delivering reductant fluid to an exhaust conduit of an exhaust aftertreatment system is disclosed. The method of delivering reductant fluid may include configuring an injector to dispense the reductant fluid into the exhaust conduit in response to a reductant delivery signal. In addition, the method of delivering reductant fluid may include fluidly connecting a pump to the injector, the pump being configured to actuate between an off condition and on condition in response to the reductant delivery signal, the off condition precluding the pump from propelling the reductant fluid to the injector, the on condition permitting the pump to propel the reductant fluid to the injector, the pump further configured to receive a pump flowrate adjustment signal. Furthermore, the method may include positioning a two-way valve in a recycle line, the recycle line located downstream of the pump and upstream of the injector, the two-way valve being configured to actuate between a closed position and an open position in response to the reductant delivery signal. Next, the method of delivering reductant fluid may include determining whether the reductant fluid needs to be delivered to the exhaust conduit, sending a reductant delivery signal to the injector and the pump when reductant fluid needs to be delivered to the exhaust conduit and actuating the pump to the on condition in response to the reductant delivery signal thereby propelling the reductant to the injector at a first mass flowrate. Finally, the method of delivering reductant fluid may include dispensing the reductant fluid into the exhaust conduit in response to the reductant delivery signal via the injector at a second mass flowrate.

These and other aspects and features of the present disclosure will be more readily understood when read in conjunction with the accompanying drawings.

BRIEF DESCRIPTION

DETAILED DESCRIPTION OF THE DISCLOSURE

Figure 1:
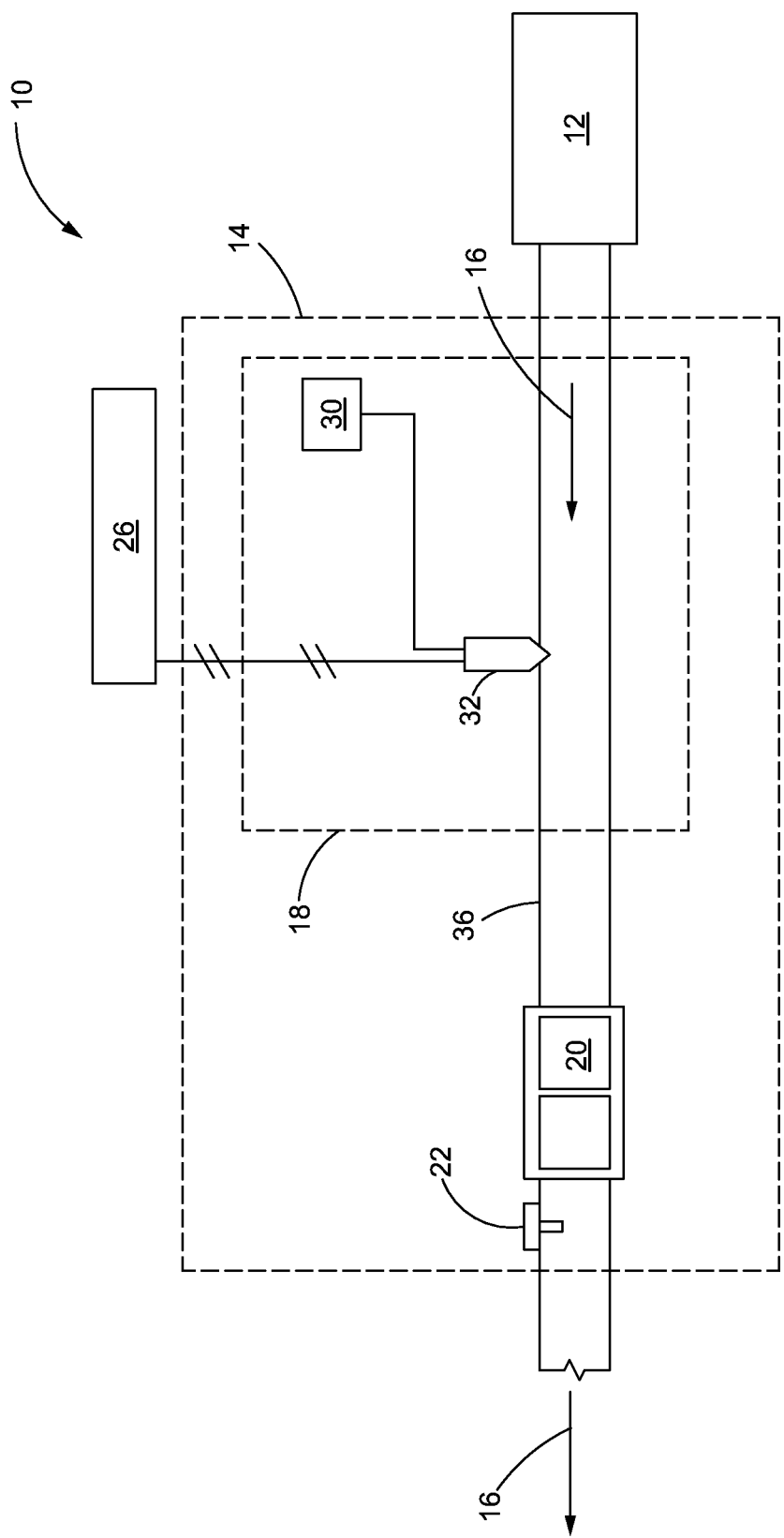
FIG. 1 is a block diagram of an exemplary engine system according to one aspect of the present disclosure.

Various aspects of the disclosure will now be described with reference to the drawings, wherein like reference numbers refer to like elements, unless specified otherwise. Referring to FIG. 1, a block diagram of an exemplary engine system 10 is illustrated, according to an aspect of the disclosure. The engine system 10 includes an engine 12, which may be an internal combustion engine such as a reciprocating piston engine or a gas turbine engine, for example. According to an aspect of the disclosure, the engine 12 is a spark ignition engine or a compression ignition engine such as a diesel engine, a homogenous charge compression ignition engine, or a reactively controlled compression ignition engine, or other compression ignition engine 12 known in the art. The engine 12 may be fueled by gasoline, diesel fuel, biodiesel, dimethyl ether, alcohol, natural gas, propane, hydrogen, combinations thereof, or any other combustion fuel known in the art.

The engine 12 may include other components such as, a fuel system, an intake system, a drivetrain including a transmission system, and so on. The engine 12 may be used to provide power to any machine including, but not limited to, an on-highway truck, an off-highway truck, an earth moving machine, an electric generator, and so on. Further, engine system 10 may be associated with any industry including, but not limited to, transportation, construction, forestry, agriculture, power generation, material handling and the like.

The engine system 10 includes an exhaust aftertreatment system 14 fluidly connected to an exhaust manifold of the engine 12. The exhaust aftertreatment system 14 is configured to treat an exhaust gas flow 16 exiting the exhaust manifold of the engine 12. The exhaust gas flow 16 contains emission compounds that may include Nitrogen Oxides ($NO_x$), unburned hydrocarbons, particulate matter and/or other combustion products known in the art. The exhaust aftertreatment system 14 may be configured to trap or convert $NO_x$, unburned hydrocarbons, particulate matter, combinations thereof, or other combustion products in the exhaust gas flow 16 before exiting the engine system 10.

The exhaust aftertreatment system 14 may include a reductant supply system 18. The reductant supply system 18 is configured to dispense a reductant fluid 34 in the exhaust gas flow 16. The exhaust aftertreatment system 14 may also include a Selective Catalytic Reduction (SCR) module 20 provided downstream of the reductant supply system 18. The SCR module 20 is configured to reduce a concentration of $NO_x$ in the exhaust gas flow 16. The SCR module 20 may include a catalyst for facilitating the reaction, reduction or removal of $NO_x$ from the exhaust gas flow 16 passing through the SCR module 20. The SCR module 20 may have a honeycomb or other structure made from, or coated with, an appropriate material. The material may be an oxide, such as, but not limited to, vanadium oxide or tungsten oxide, coated on an appropriate substrate, such as titanium dioxide. The SCR module 20 may have a monolithic structure or may include multiple banks based on system requirements.

According to one aspect of the disclosure, the exhaust aftertreatment system 14 may include a filter (not shown), such as, for example, a Diesel Particulate Filer (DPF), provided upstream of the SCR module 20. The DPF may be coated with a suitable catalyst to promote oxidation of any particulate matter in the exhaust gas flow 16 that may be trapped in the DPF. Additionally, in another aspect, the exhaust aftertreatment system 14 may further include a Diesel Oxidation Catalyst (DOC). In such aspect, the DOC may be positioned upstream of the SCR module 20 in an exhaust flow direction. Alternatively, the exhaust aftertreatment system 14 may omit the DPF and include only the SCR module 20. In yet another aspect, a combined DPF/SCR catalyst (not shown) may be used.

Further, the exhaust aftertreatment system 14 may include one or more $NO_x$ sensors 22. The $NO_x$ sensor 22 may be located at various locations within the exhaust aftertreatment system 14. For example, the $NO_x$ sensor 22 may be located upstream and/or downstream of the SCR module 20. The $NO_x$ sensor 22 may be configured to measure the concentration of $NO_x$ compounds in the exhaust gas flow 16 passing through the exhaust aftertreatment system 14 and transmit an engine system operation signal 24 to a controller 26. The controller 26 may be any type of electronic processor such as a dedicated processor on board the engine 12 or machine employing the engine 12.

The controller 26 may be configured to receive the engine system operation signal 24 and transmit a reductant delivery signal 28 in response to the engine system operation signal 24. The controller 26 may be centralized to the powered machine. Alternatively, the controller 26 may be associated only with the engine system 10, and in other instances the controller 26 may be specifically associated with the exhaust aftertreatment system 14 and distinct from an analogous device that controls the operation of the engine 12.

The exhaust aftertreatment system 14 disclosed herein is provided as a non-limiting example. It will be appreciated that the exhaust aftertreatment system 14 may be disposed in various arrangements and/or combinations relative to the exhaust manifold. These and other variations in exhaust aftertreatment system 14 design are possible without deviating from the scope of the disclosure.

As shown in FIG. 1, the reductant supply system 18 includes a reductant fluid tank 30 and an injector 32 configured to dispense a reductant fluid 34 into the exhaust gas flow 16 of the exhaust aftertreatment system 14. The reductant fluid tank 30 is provided in fluid communication with the injector 32 and is configured to store the reductant fluid 34 therein. The reductant fluid 34 may be a fluid, such as, Diesel Exhaust Fluid (DEF). Alternatively, the reductant fluid 34 may include urea, ammonia, or other reducing agent known in the art. Parameters related to the reductant fluid tank 30 such as size, shape, location and material used may vary according to system design and requirements.

The exhaust gas flow 16 may be conveyed through an exhaust conduit 36 in a direction towards the SCR module 20. More specifically, the exhaust conduit 36 may be fluidly coupled to an exhaust manifold of the engine 12, and also fluidly coupled with the injector 32 and the SCR module 20. The injector 32 may be configured to dispense the reductant fluid 34 into the exhaust gas flow 16 in response to the reductant delivery signal 28. In an aspect of the disclosure, the reductant supply system 18 may include one or more pairs of injectors 32 (See FIG. 2). The number of injector 32 may vary based on the type of application.

Figure 2:
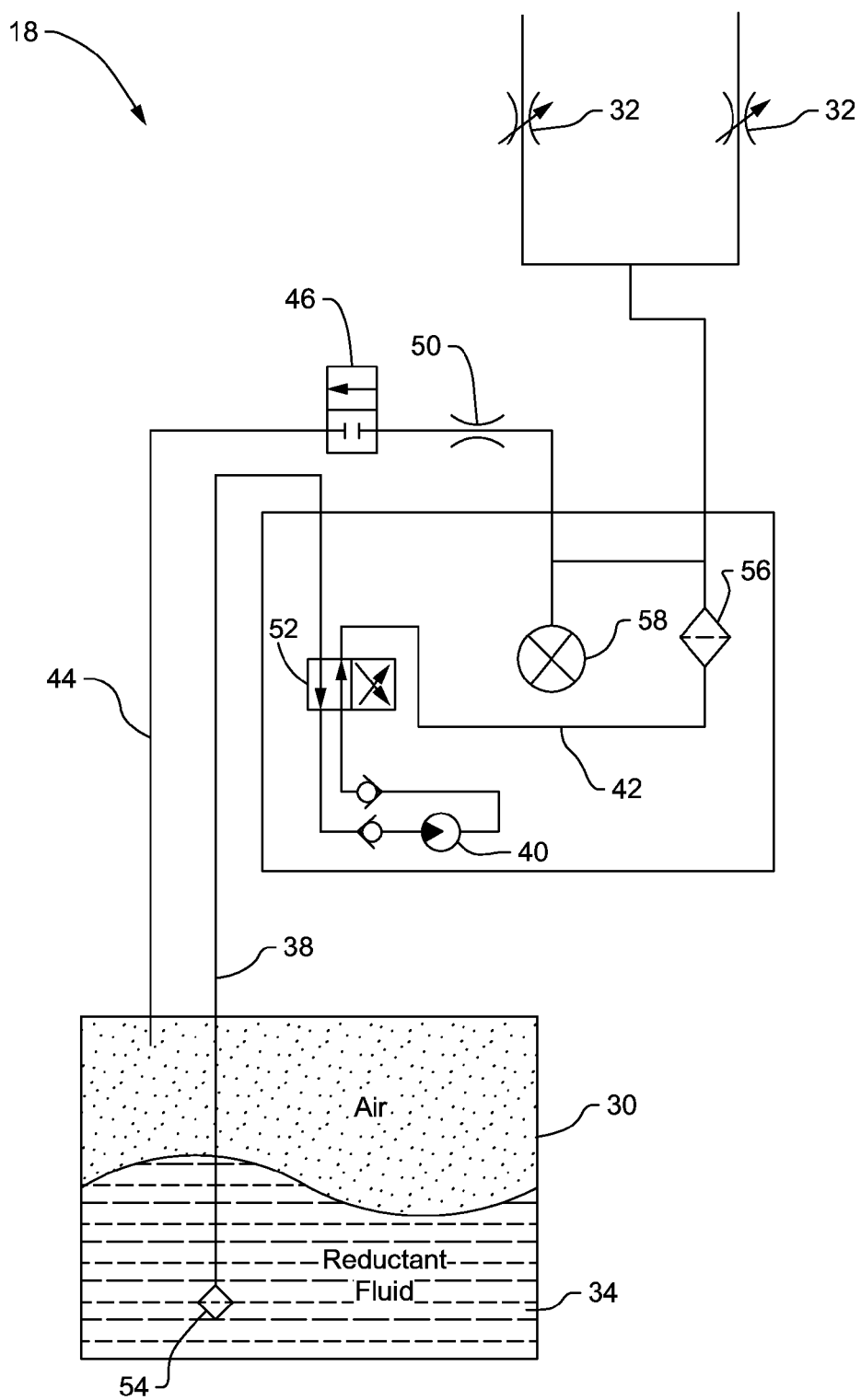
FIG. 2 is a schematic illustration of a reductant supply system according to one aspect of the present disclosure.

FIG. 2 is a schematic illustration of the reductant supply system 18 according to an aspect of the disclosure. As shown, the reductant supply system 18 may include a suction line 38 arranged and configured to fluidly couple the reductant fluid 34 in the reductant fluid tank 30 with a pump 40. The pump 40 may be configured to propel the reductant fluid 34 through the reductant supply system 18 and may be any type of pump 40 known to persons of skill in the art. Pump 40, for example, may be a peristaltic, gear, rotary or diaphragm type pump. Further, pump 40 may be a variable speed pump 40 varied such that the flowrate of the reductant fluid 34 through the reductant supply system 18 may vary. Further, the pump 40 may be configured to actuate between an off condition and an on condition in response to the reductant delivery signal 28, the off condition precluding the pump 40 from propelling the reductant fluid 34 through the reductant supply system 18, and the on condition permitting the pump 40 to propel the reductant fluid 34 through the reductant supply system 18.

The reductant supply system 18 may include a pressure line 42 arranged and configured to fluidly couple the pump 40 with the injector 32. Further, the reductant supply system 18 may include a recycle line 44 located downstream of the pump 40 and upstream of the injector 32. The recycle line 44 may be fluidly coupled to the pump 40 and the injector 32 via the pressure line 42. The recycle line 44 may be configured to return the reductant fluid 34 to the reductant fluid tank 30.

Ordinarily, the flowrate of the reductant fluid 34 returning to the reductant fluid tank 30 via the recycle line 44 is controlled by placing a restriction, such as throttle-valve, in the recycle line 44. However, due to pump 40 sizing issues, reductant supply system 18 designers customarily oversize the pump 40 relative to the maximum flowrate needed by the injector 32, thereby leading to energy inefficiency. One conventional way to resolve this energy inefficiency is to place a proportioning valve in the recycle line 44. However, as described before, although utilizing a proportioning valve in the recycle line 44 may increase energy efficiency, it additionally necessitates the use of a complex closed loop control system 62 than is necessary to control operation of a reductant supply system 18.

The present disclosure greatly improves on such conventional systems and as shown in FIG. 2 having a reductant supply system 18 including a two-way valve 46 positioned in the recycle line 44. Such two-way valve 46 is more energy efficient than the conventionally used restriction or throttle-valve. Further, utilizing the two-way valve 46, rather than the proportioning valve, simplifies the control schemes needed to operate the reductant supply system 18. One reason for these advantages is that the two-way valve 46 may be configured to actuate between a closed position and an open position in response to the reductant delivery signal 28. The closed position may preclude the reductant fluid 34 from returning to the reductant fluid tank 30 via the recycle line 44, and the open position may permit the reductant fluid 34 to return to the reductant fluid tank 30 via the recycle line 44. As should be evident, since the two-way valve 46 only actuates between a fully closed position and a fully open position, the operation of the reductant supply system 18 therefore does not require additional knowledge of the current size of the variable cross-sectional orifice or the period such variable cross-sectional orifice is opened, thereby simplifying the control scheme to operate a reductant supply system 18. Further, since the open position of the two-way valve 46 may more closely mimic a conventional restriction such as a throttle-valve, the two-way valve 46 may be more easily specified to the maximum flowrate required by the injector 32.

Accordingly, based on the foregoing, the two-way valve 46 may initially be in a closed position, the pump 40 may be configured to propel the reductant fluid 34 to the injector 32 at a first mass flowrate, the injector 32 may be configured to dispense the reductant fluid 34 to the exhaust gas flow 16 at a second mass flowrate. In this instance, the second mass flowrate may be less than the first mass flowrate. Thereafter, and in response to the reductant delivery signal 28, the two-way valve 46 may actuate from the closed position to the open position, thereby allowing excess reductant fluid 34 to flow through the recycle line 44 to the reductant fluid tank 30. When the first mass flowrate is greater than necessary at the injector 32, and the two-way valve 46 is in the open position, the controller 26 may further transmit a pump flowrate adjustment signal 48 to the pump 40. Thereafter, the pump 40 may propel the reductant fluid 34 at a third mass flowrate to the injector 32 less than the first mass flowrate. This third mass flowrate may be less than or equal to the second mass flowrate.

Alternatively, the two-way valve 46 may initially be in the closed position, the pump 40 may be configured to propel the reductant fluid 34 to the injector 32 at first mass flowrate and the injector 32 may be configured to dispense the reductant fluid 34 to the exhaust gas flow 16 at a second mass flowrate. In this instance, the second mass flowrate may be less than the first mass flowrate. Thereafter, the controller 26 may transmit the pump flowrate adjustment signal 48 to the pump 40, which then propels the reductant fluid 34 to the injector 32 at a third mass flowrate less than the first mass flowrate.

In another aspect, the two-way valve 46 may initially be in an open position, the pump 40 may be configured to propel the reductant fluid 34 to the injector 32 at a first mass flowrate and the injector 32 may be configured to dispense the reductant fluid 34 to the exhaust gas flow 16 at a second mass flowrate. In this instance, the second mass flowrate may be greater than the first mass flowrate. Thereafter, and in response to the reductant delivery signal 28, the two-way valve 46 may actuate from the open position to the closed position, thereby precluding excess reductant fluid 34 from flowing through the recycle line 44 to the reductant fluid tank 30. When the first mass flowrate is less than is necessary at the injector 32, and such two-way valve 46 is in the closed position, the controller 26 may further transmit a pump flowrate adjustment signal 48 to the pump 40. Thereafter, the pump 40 may propel the reductant fluid 34 at a third mass flowrate greater than the first mass flowrate. The third mass flowrate in this instance may be less than or equal to the second mass flowrate.

In another instance, the two-way valve 46 may initially be in an open position, the pump 40 is further configured to propel the reductant fluid 34 to the injector 32 at a first mass flowrate and the injector 32 may be configured to dispense the reductant fluid 34 to the exhaust gas flow 16 at a second mass flowrate less than the first mass flowrate. Thereafter, the controller 26 may transmit a pump flowrate adjustment signal 48 to the pump 40, which then propels the reductant fluid 34 to the injector 32 at a third mass flowrate less than or equal to the second mass flowrate.

As shown in FIG. 2, the reductant supply system 18 may include a flow control orifice 50 positioned in the recycle line 44 upstream or downstream of the two-way valve 46. Alternatively, the flow control orifice 50 may be integrated into the two-way valve 46. The reductant supply system 18 may include a reversing valve 52 positioned upstream of the injector 32 and the recycle line 44, and be configured to reverse the flow direction of the reductant fluid 34 back towards the reductant fluid tank 30. Further, the reductant supply system 18 may include an in-tank filter to remove particulate matter from the reductant fluid 34 before entering the suction line 38. An in-line filter 56 may also be positioned in the pressure line 42 to remove any particulate matter from the reductant fluid 34 before reaching the injector 32. Lastly, the reductant supply system 18 may include a pressure sensor 58 positioned in the pressure line 42 configured to measure the mass flowrate of the reductant fluid 34 in the pressure line 42 and transmit a pressure signal to the controller 26.

Figure 3:
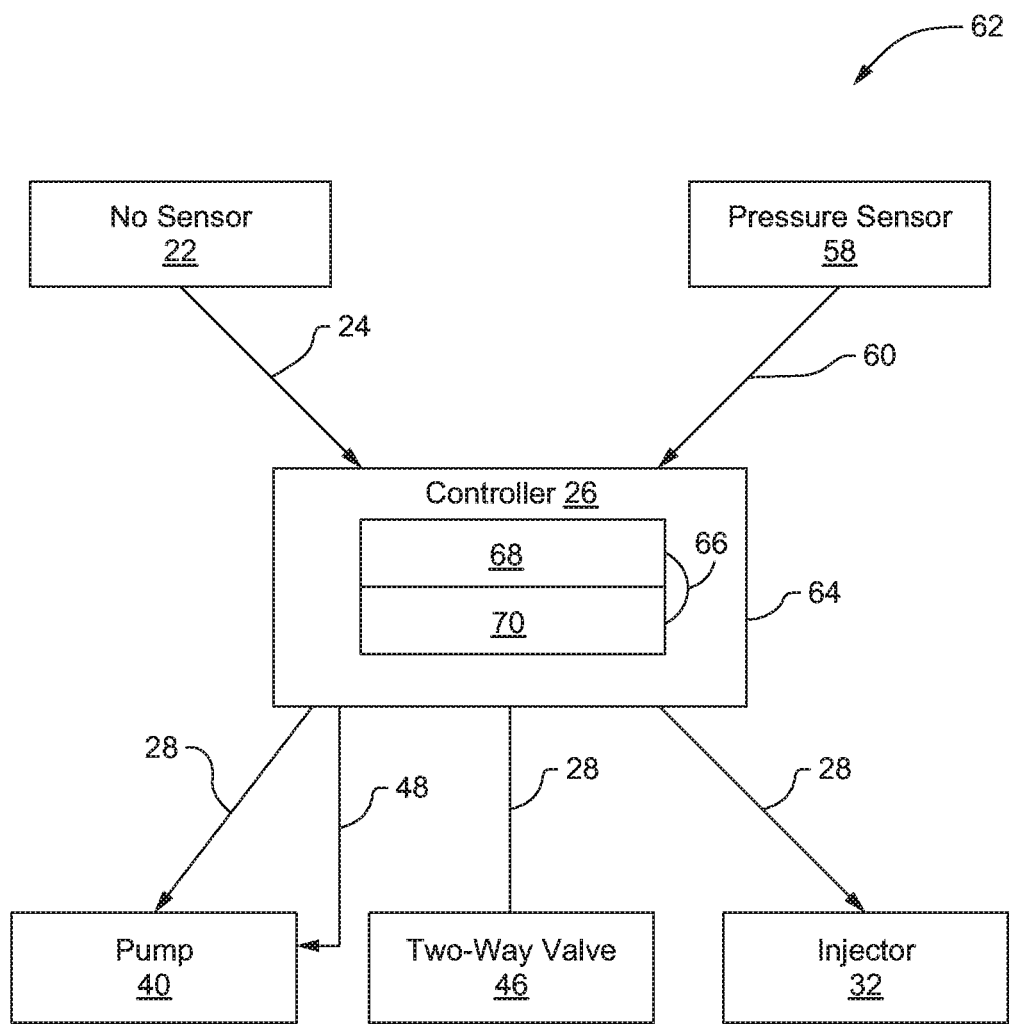
FIG. 3 is a block diagram of an exemplary control system that may be used in conjunction with present disclosure.

Turning now to FIG. 3, an exemplary control system that may be utilized with present disclosure is illustrated and is generally referred to by the reference numeral 62. Such control system 62 may include the $NO_x$ sensor 22 and pressure sensor 58 previously described. Further, as seen in FIG. 3, the $NO_x$ sensor 22 and pressure sensor 58 may be operatively coupled to the controller 26 and configured to transmit an engine system operation signal 24 and flowrate signal 60, respectively, to the controller 26. The controller 26 may be implemented to control the operation of the reductant supply system 18. The controller 26 may include a microprocessor 64 for executing specified programs that control and monitor various functions associated with reductant supply system 18, including actuating the pump 40 between the on condition and the off condition, actuating the two-way valve 46 between the closed position and the open position and configuring the injector 32 to dispense the reductant fluid 34 into the exhaust gas flow 16 at the second mass flowrate. The microprocessor 64 may be associated with a memory 66, such as read only memory (ROM) 68, for storing a program or programs, and a random access memory (RAM) 70 which serves as a working area for use in executing the programs stored in memory 66. Although microprocessor 64 is shown, it is also possible and contemplated to use other electronic components such as a microcontroller, an ASIC (application specific integrated circuit) chip or any other integrated circuit device.

The controller 26 may be operatively connected to the injector 32, pump 40 and the two-way valve 46. Further, the controller 26 may be configured to transmit the reductant delivery signal 28 to the injector 32, pump 40 and two-way valve 46. In response, the pump 40 may propel the reductant fluid 34 towards the injector 32 at the first mass flowrate, the injector 32 may dispense the reductant fluid 34 into the exhaust gas flow 16 at the second mass flowrate, and the two-way valve 46 may actuate between the closed position and the open position, or the open position and the closed position. The controller 26 may be further configured to receive the flowrate signal 60 and transmit the pump flowrate adjustment signal 48 so the pump 40 thereafter propels the reductant fluid 34 to the injector 32 at the third mass flowrate.

INDUSTRIAL APPLICABILITY

In operation, the teachings of the present disclosure can find applicability in many industrial applications, such as, but not limited to, exhaust aftertreatment systems for engines and machines supplying such engines. For example, exhaust aftertreatment systems disclosed herein can be used in engines, such as, a spark ignition engine or a compression ignition engine such as a diesel engine, a homogeneous charge compression ignition engine, or a reactively controlled compression ignition engine, or other compression ignition engine known in the art. The engine 12 may be fueled by gasoline, diesel fuel, biodiesel, dimethyl ether, alcohol, natural gas, propane, hydrogen, combinations thereof, or any other combustion fuel known in the art.

Figure 4:
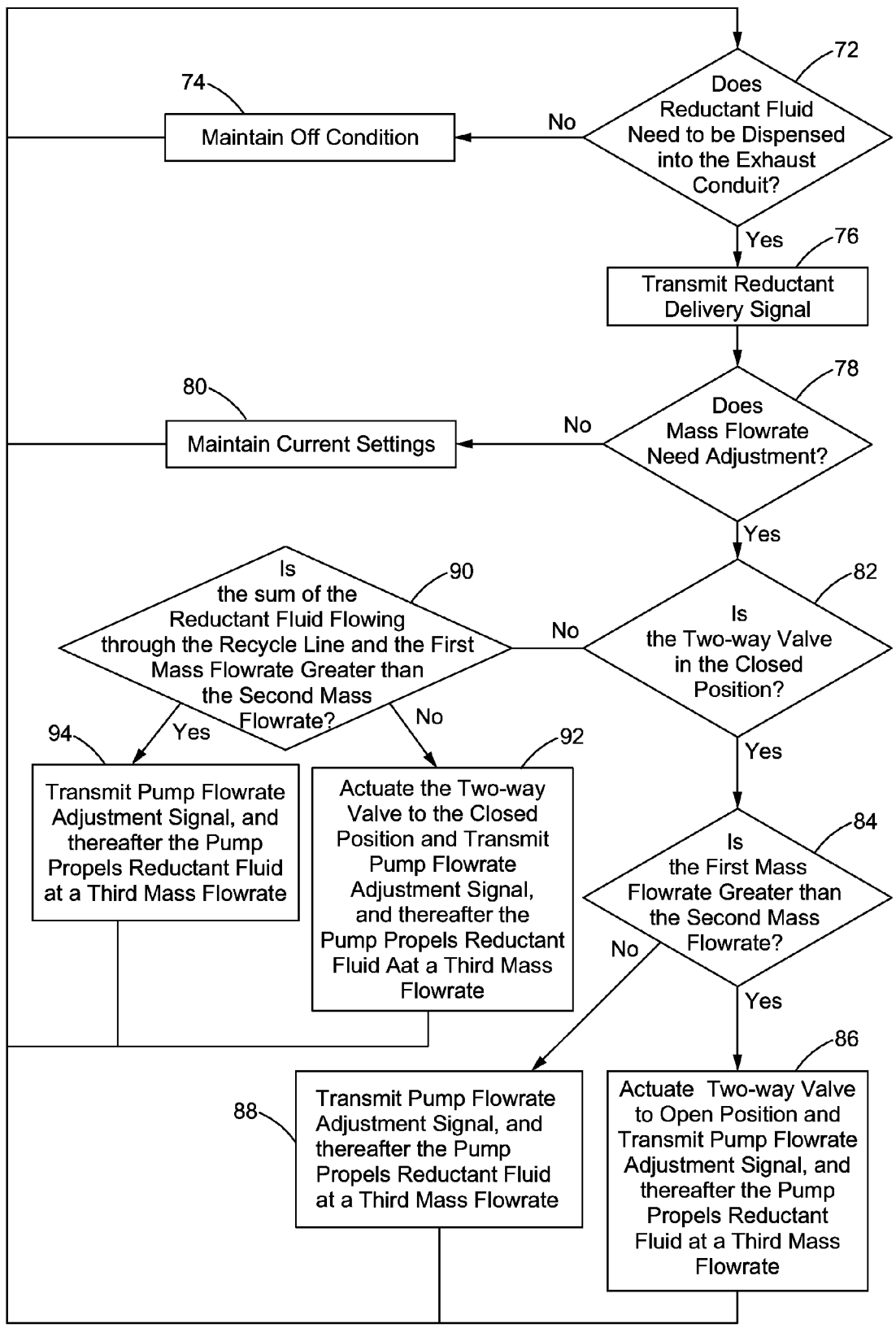
FIG. 4 is a flowchart illustrating exemplary steps of a method for controlling the flow of reductant in the reductant supply system of the present disclosure.

Referring now to FIG. 4, an exemplary flowchart is shown depicting a sample sequence of steps which may be followed to dispense reductant fluid 34 into the exhaust gas flow 16 of the exhaust aftertreatment system 14 utilizing the reductant supply system 18 and control system 62 of the present disclosure. Step 72 of the method may include determining whether reductant fluid 34 needs to be dispensed into the exhaust conduit 36. For example, as described before, the $NO_x$ sensor 22 may measure the concentration of $NO_x$ compounds in the exhaust gas flow 16 and transmit the engine system operation signal 24 to the controller 26. The controller 26 may utilize the engine system operation signal 24 and determine whether the reductant fluid 34 needs to dispense into the exhaust conduit 36. If such controller 26 determines that no reductant fluid 34 needs to be dispensed, then a reductant supply system 18 off condition may be maintained at step 74 and the algorithm may return to step 72.

However, if reductant fluid 34 does need to be delivered to the exhaust conduit 36, then the controller 26 may transmit the reductant delivery signal 28 to the injector 32, pump 40 and two-way valve 46 at step 76. Step 78 may include determining whether the mass flowrate delivered to the injector 32 needs adjustment. As described above, the pressure sensor 58 may be configured to measure the mass flowrate of the reductant fluid 34 in the pressure line 42 and subsequently transmits a flowrate signal 60 to the controller 26. The controller 26 may utilize the flowrate signal 60 and determine whether the mass flowrate delivered to the injector 32 requires adjusting. If the controller 26 determines the flowrate does not require adjustment, then the current settings of the injector 32, pump 40 and two-way valve 46 may be maintained at step 80. Thereafter, the method may return to step 72.

If step 78 determines that mass flowrate needs adjustment, then at step 82, the control system 62 may determine if the two-way valve 46 is in the closed position. Subsequently, and if the two-way valve 46 is in the closed position, then the controller 26 may determine if the first mass flowrate is greater than the second mass flowrate, such as by using the flowrate signal 60 of the pressure sensor 58 at step 84. Thereafter, the two-way valve 46 may be actuated to the open position to allow reductant fluid 34 to flow through the recycle line 44, and a pump flowrate adjustment signal 48 may be transmitted to the pump 40, and thereafter the pump 40 may propel the reductant fluid 34 at a third mass flowrate less than or equal to the second mass flowrate at step 86 of the method. Thereafter, the method may return to step 72.

If however, the first mass flowrate is less than the second mass flowrate, then the controller 26 may transmit a pump flowrate adjustment signal 48 to the pump 40 at step 88. Thereafter, the pump 40 may propel the reductant fluid 34 at a third mass flowrate greater than the first mass flowrate, which is less than or equal to the second mass flowrate at step 88. Subsequently, the method may return to step 72.

Returning to step 82, if the two-way valve 46 is in the open position, then the controller 26 at step 90 may determine whether the sum of the reductant fluid 34 flowing through the recycle line 44 and the first mass flowrate is greater than the second mass flowrate such as by using the flowrate signal 60 of the pressure sensor 58. Thereafter, the two-way valve 46 may be actuated to the closed position to preclude reductant fluid 34 from flowing through the recycle line 44, and the controller 26 may send a pump flowrate adjustment signal 48 to the pump 40 at step 92. Subsequently, the pump 40 may propel the reductant fluid 34 at a third mass flowrate greater than the first mass flowrate, and less than or equal to the second mass flowrate at step 92. The method may then return to step 72.

If however, the sum of the reductant fluid 34 flowing through the recycle line 44 and the first mass flowrate is greater than the second mass flowrate, then the controller 26 may transmit a pump flowrate adjustment signal 48 to the pump 40 at step 94. Thereafter, the pump 40 may propel the reductant fluid 34 at a third mass flowrate less than the first mass flowrate, which is less than or equal to the second mass flowrate at step 94. The method may return to step 72.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A reductant supply system for an exhaust aftertreatment system, comprising:
    a controller configured to receive an engine system operation signal and transmit a reductant delivery signal in response to the engine system operation signal;
    an injector configured to dispense a reductant fluid into an exhaust gas flow of the exhaust aftertreatment system in response to the reductant delivery signal;
    a pump configured to actuate between an off condition and an on condition in response to the reductant delivery signal, the off condition precluding the pump from propelling the reductant fluid to the injector, the on condition permitting the pump to propel the reductant fluid to the injector;
    a recycle line;
    a two-way valve positioned in the recycle line configured to actuate between a closed position and an open position in response to the reductant delivery signal, the closed position precluding the reductant fluid from flowing through the recycle line to a reductant fluid tank, the open position permitting the reductant fluid to flow through the recycle line to the reductant fluid tank, the two-way valve initially being in the open position, the pump being further configured to propel the reductant fluid to the injector at a first flowrate, the injector being further configured to dispense the reductant fluid to the exhaust gas flow at a second mass flowrate greater than the first mass flowrate, the two-way valve thereafter actuating to the closed position in response to the reductant delivery signal thereby precluding the reductant fluid from flowing through the recycle line to the reductant fluid tank.

2. The reductant supply system according to claim 1, wherein the controller is further configured to transmit a pump flowrate adjustment signal to the pump after the two-way valve actuates to the closed position, and the pump is further configured to receive the pump flowrate adjustment signal and thereafter propel the reductant fluid at a third mass flowrate greater than the first mass flowrate and less or equal to the second mass flowrate.

3. The reductant supply system according to claim 1, further including a flow control orifice positioned in the recycle line upstream or downstream of and in series with the two-way valve.

4. The reductant supply system according to claim 1, further including a flow control orifice integrated into the two-way valve.

5. The reductant supply system according to claim 1, further including a reversing valve positioned upstream of the injector and the recycle line configured to reverse flow direction of the reductant fluid.

6. An exhaust aftertreatment system, comprising:
    an engine;
    an exhaust conduit fluidly coupled to the engine and configured to convey an exhaust gas flow of the engine;
    an injector fluidly coupled to the exhaust conduit and configured to dispense a reductant fluid into the exhaust gas flow of the engine in response to a reductant delivery signal;
    a pump configured to actuate between an off condition and an on condition in response to the reductant delivery signal, the off condition precluding the pump from propelling the reductant fluid to the injector, the on condition permitting the pump to propel the reductant fluid to the injector;
    a recycle line fluidly coupled to the pump and the injector, located downstream of the pump and upstream of the injector and configured to return the reductant fluid to a reductant fluid tank;
    a two-way valve positioned in the recycle line configured to actuate between a closed position and an open position in response to the reductant delivery signal, the closed position precluding the reductant fluid from flowing through the recycle line to the reductant fluid tank, the open position permitting the reductant fluid to flow through the recycle line to the reductant fluid tank; and
    a controller configured to receive an engine system operation signal, transmit the reductant delivery signal in response to the engine system operation signal, and transmit a pump flowrate adjustment signal to the pump, the two-way valve initially being in the open position, the pump being further configured to propel the reductant fluid to the injector at a first mass flowrate, the injector being further configured to dispense the reductant fluid to the exhaust gas flow at a second mass flowrate less than the first mass flowrate, the pump being further configured to receive the pump flowrate adjustment signal and thereafter propel the reductant fluid at a third mass flowrate less than or equal to the second mass flowrate.

7. The exhaust aftertreatment system according to claim 6, further including a NO$_x$ sensor associated with the exhaust conduit configured to transmit the engine system operation signal to the controller.

8. The exhaust aftertreatment system according to claim 6, further including a flow control orifice positioned in the recycle line upstream or downstream of and in series with the two-way valve.

9. The exhaust aftertreatment system according to claim 6, further including a reversing valve positioned upstream of the injector and the recycle line configured to reverse flow direction of the reductant fluid.

10. A method of delivering reductant fluid to an exhaust conduit of an exhaust aftertreatment system, comprising:
   configuring an injector to dispense the reductant fluid into the exhaust conduit in response to a reductant delivery signal;
   fluidly connecting a pump to the injector, the pump being configured to actuate between an off condition and an on condition in response to the reductant delivery signal, the off condition precluding the pump from propelling the reductant fluid to the injector, the on condition permitting the pump to propel the reductant fluid to the injector, the pump further configured to receive a pump flowrate adjustment signal;
   positioning a two-way valve in a recycle line, the recycle line located downstream of the pump and upstream of the injector, the two-way valve being configured to actuate between a closed position and an open position in response to the reductant delivery signal, the closed position precluding the reductant fluid from flowing through the recycle line to a reductant fluid tank, the open position permitting the reductant fluid to flow through the recycle line to the reductant fluid tank, the two-way valve initially being in the open position;
   determining whether the reductant fluid needs to be delivered to the exhaust conduit;
   sending the reductant delivery signal to the injector and the pump when reductant fluid needs to be delivered to the exhaust conduit;
   actuating the pump to the on condition in response to the reductant delivery signal thereby propelling the reductant to the injector at a first mass flowrate;
   dispensing the reductant fluid into the exhaust conduit in response to the reductant delivery signal via the injector at a second mass flowrate greater than the first mass flowrate; and
   actuating the two-way valve to the closed position in response to the reductant delivery signal thereby precluding the reductant fluid from flowing through the recycle line to the reductant fluid tank.

* * * * *